(12) United States Patent
Kiyota

(10) Patent No.: US 7,459,409 B2
(45) Date of Patent: Dec. 2, 2008

(54) UNSHAPED REFRACTORIES

(75) Inventor: Yoshisato Kiyota, Tokyo (JP)

(73) Assignee: JFE Steel Corporation (JP)

( * ) Notice: Subject to any disclaimer, the term of this patent is extended or adjusted under 35 U.S.C. 154(b) by 53 days.

(21) Appl. No.: 11/159,797

(22) Filed: Jun. 23, 2005

(65) Prior Publication Data

US 2005/0288170 A1    Dec. 29, 2005

(30) Foreign Application Priority Data

Jun. 29, 2004   (JP)   ............................ 2004-190623

(51) Int. Cl.
  *C04B 35/443*   (2006.01)
  *C04B 35/101*   (2006.01)
(52) U.S. Cl. ..................... 501/120; 501/122; 501/124
(58) Field of Classification Search ................ 501/119, 501/120, 122, 124; 266/280–286
See application file for complete search history.

(56) References Cited

U.S. PATENT DOCUMENTS

| 4,769,352 | A | | 9/1988 | Stark | |
|---|---|---|---|---|---|
| 4,990,475 | A | | 2/1991 | Matsumoto et al. | |
| 5,932,506 | A | * | 8/1999 | Bogan | ..................... 501/89 |
| 5,972,102 | A | * | 10/1999 | Vezza | ..................... 106/692 |
| 6,730,159 | B1 | * | 5/2004 | Falaschi et al. | ............. 106/692 |

FOREIGN PATENT DOCUMENTS

| EP | 0 535 233 A1 | 4/1993 |
|---|---|---|
| JP | 06 040774 A | 2/1994 |
| JP | 11 310471 A | 11/1999 |
| JP | 2004 307293 A | 11/2004 |

* cited by examiner

*Primary Examiner*—Karl E Group
(74) *Attorney, Agent, or Firm*—DLA Piper US LLP

(57) ABSTRACT

Excellent characteristics concerning slag penetration-resistance, corrosion-resistance, and structural stability on usage of lining-refractory such as equipment for desiliconizing molten iron, a ladle for steel-making, a RH equipment are obtained. Unshaped refractories provide fine particles of under 0.75mm diameter, and aggregate of 0.75-10mm. Furthermore, the fine particles contain 10-35 mass % content of MgO, to the total mass % of the fine particles. Even furthermore, the sum total amount of MgO and $Al_2O_3$ is more than 90 mass %, to the total mass % of the fine particle. Additionally, such fine particles has 5-40 mass % of particles made of periclase-spinel, as a source of MgO, to the total mass % of the unshaped refractories. And, the aggregate comprises at least one selected from the group consisting of particles made of alumina and particles made of spinel.

4 Claims, 7 Drawing Sheets

UNSHAPED REFRACTORIES

TECHNICAL FIELD

This disclosure relates to unshaped refractories excelling in the characteristics of keeping slag penetration-resistance corrosion-resistance, and structural stability.

BACKGROUND ART

Conventionally, as for the unshaped refractories used in equipment for desiliconizing molten iron, a ladle for steel-making, RH equipment for steel-making and so forth, the following kinds of unshaped refractories have been put in practical use, until today. That is to say, one example in practical use is unshaped refractories made of a line of alumina-spinel, resulting from improving the corrosion-resistance and the slag penetration-resistance that the unshaped refractories made of a line of high alumina-spinel has. (See Published Patent Application No. 55-23004, Published Patent Application No. 59-128271, Published Patent Application No. 64-87577). And, it may be a case, another example in practical use is unshaped refractories made of a line of alumina-magnesia. (See Published Patent Application No. 63-218586).

Generally, it is known that the corrosion-resistance and the slag penetration-resistance of the unshaped refractories are governed by the corrosion-resistance and the slag penetration-resistance of a portion of fine particles. (Note: the portion of the fine particles is equivalent to a matrix of the unshaped refractories. Generally, a matrix means 'continuous metal phase that includes a number of pores and/or other kinds of particles made of other gradient inside of the structure, to serve as a base in a sintered material'. In this invention, the portion of the fine particles in the formed unshaped refractories is defined as matrix.)

Taking the above-mentioned matter into consideration, fine particles made of spinel (the composition of the spinel is 28.3% MgO—$Al_2O_3$) are used for a part of the fine particles, in case that the unshaped refractories made of a line of alumina-spinel are used. They are used to a considerable amount. In comparison with alumina, such spinel has the characteristic of high corrosion-resistance and has an effect on prohibiting slag penetration, while trying to improve the characteristics of the corrosion-resistance and the slag penetration-resistance.

On the other hand, as for unshaped refractory made of a line of alumina-magnesia, fine particles made of alumina and magnesia are used for a part of the fine particles, while trying to improve the characteristics of the corrosion resistance and the slag penetration-resistance, expecting the action of the spinel that generates at high temperature on usage.

(Note: From a general technical viewpoint, 'spinel' means aluminate-magnesium (MgO—$Al_2O_3$). In this invention, the substance, whose composition is 28.3% MgO—$Al_2O_3$, is defined as spinel. Additionally defining, the spinel has a spinel-structure in the phase-diagram of $Al_2O_3$—MgO. And the substance having the state of 28.3% MgO—$Al_2O_3$ composition is called for the substance having spinel-structure (in other word, spinel-texture). (See FIG. 7, which relates to a general phase-diagram of $Al_2O_3$—MgO in the conventional technology.) Supplementary explaining, in this invention, 'structure' means the macroscopic relation between the pore and the particle, which have a variety of figures and sizes respectively.

Briefly explaining in a fundamental way, in case of the above-mentioned unshaped refractories made of a line of alumina-spinel, the whole of the fine particles and the ultra fine one, where the particles constitute a matrix, have spinel-composition, so as to try to improve the corresponding corrosion-resistance. However, focusing on such a technology, fine particles and ultra fine one of the spinel cost high. Especially the ultra fine particles require spending the cost to even higher extent, resulting in encountering with such a problem as economical efficiency.

Furthermore, in case of using such unshaped refractories, the ultra fine particles made of alumina, which are added for improving the mobility under construction, react with spinel at high temperature range. In the same way, the alumina cement, which is added as a binder for securing the strength at normal temperature, react with spinel at high temperature range. Consequently, there occurs a tendency for composition of the matrix portion to shift from a spinel-composition to an alumina-rich side. Resultantly, it was pointed out that corrosion-resistance and slag penetration-resistance become relatively inferior, in comparison with the unshaped refractories made of alumina-magnesia. In addition, there is the following attempt to solve such a disadvantage in the world. That is, it may be a case, fine particles made of magnesia are added in order for the composition not to shift to an alumina-rich side.

Taking a look at another one in the above-mentioned unshaped refractories, which means the unshaped refractories made of a line of alumina-magnesia, cubical expansion happens, accompanied by the change of the crystal structure, when the spinel generates in the reaction-procedure in the high temperature region. Resultantly, it may be a case, cracks generate. This invites the anxiety about the inferiority of the structural stability. Furthermore, when the magnesia spreads into the surrounding alumina-phase, a one-way diffusion-phenomenon happens. At such a stage, the trace generates after the fine particles of the magnesia spread, in which the fine particles of the magnesia previously existed. Resultantly, such a trace, where the fine particles of the magnesia previously existed, becomes to be a form of pore. Such pores cause cubical expansion, resulting in degrading the slag penetration-resistance. From the standing point of the corrosion-resistance, both of the above-mentioned two reasons, which are, less structural stability and less slag penetration-resistance bring about a serious problem.

The technical problem caused by the conventional technology mentioned above is shown in FIG. 5. FIG. 5 is related to the conventional technology, showing a conception drawing concerning how alumina-magnesia material as a refractory one changes the structure, associated with the change of sintering-temperature.

Concerning the structure of the sintering-temperature up to approximately 1100° C., a numeric reference No. 51 is fine particles made of magnesia(MgO). No. 52 is mainly alumina and the other mixed substances mutually. In the structure of the sintering-temperature up to approximately 1300° C., a numeric reference No. 53 means a mixture of magnesia (MgO) and the other mixed substances. At such sintering-temperature, the magnesia (MgO) spreads outwardly from the center of the magnesia particles to the outer direction. That is to say, such diffusion is done to spread in one-way direction. In this case, there occurs no mutual diffusion, which means, this diffusion is not done in the opposite way, face to face against arrow-mark (5a) in FIG. 5. Furthermore, when the magnesia (MgO) is sintered to an extent of high temperature, up to approximately 1500° C., the magnesia advances more diffusing in one-way. On such a stage, spinel generates in the portion of a numeric reference No. 53. However, at the same moment, the pore (54) caused by the trace generates. The trace generates by an omission of magnesia (MgO), though. These pores bring about the rate of unrequited high porosity. And these pores do the rate of unrequited thermal expansion in the unshaped refractories. After all, the unshaped refractories end up in having the high rate of permanent linear expansion (permanent linear change on reheating). Here, the high rate is one kind of the defective characteristics as physical properties of unshaped refractories.

Further, the conventional technology is accompanied with the following defective problem. That is, fine particles made of magnesia, which are used as raw materials, react with water to cause hydration-collapse. Such water is added under construction, though. Resultantly, the unshaped refractories receive a damage of such hydration-collapse. (Note: in this invention, 'hydration-collapse' means a phenomenon where refractory-structure breaks by expansion, being influenced by the hydration reaction.). Furthermore supplementary explaining, the fine particles made of magnesia have a possibility to enforce the hardening-time of cement to fluctuate when the material is mixed with water.

As mentioned above, in comparison with the unshaped refractories made of aluminum-magnesia, the unshaped refractories made of aluminum-spinel have the following tendency on usage. That is to say, in case of aluminum-spinel, the matrix-structure on usage falls within a range of alumina-rich, resulting in inviting such a problem that the corrosion-resistance and the slag penetration-resistance become inferior. Concerning another one, which is, in case of the unshaped refractories made of aluminum-magnesia, the matrix-structure on usage becomes spinel. Although such spinel gives the unshaped refractories the characteristics of the high corrosion-resistance and the slag penetration-resistance to some degree, the cubic expansion occurs and pores generate, resulting in the serious problems such as cracking and breaking, simultaneously with generating the spinel. It is associated with inferiority in structural stability. Not only the structural stability but also the slag penetration-resistance deteriorates by the reason of generating pores, resulting in much less improvement of the characteristics than the expectation.

SUMMARY

I provide unshaped refractories used as a refractory lining, such as equipment for desiliconizing molten iron, a ladle for steel-making, RH equipment in the steel-making process and so forth.

The unshaped refractories have both of the following two characteristics. One characteristic is high corrosion-resistance and slag penetration-resistance, as the same as the unshaped refractories made of a line of alumina-magnesia. The other one is structural stability, as the same as the unshaped refractories made of a line of aluminum-spinel. I provide both of the respective excellent characteristics in this way.

I discovered that the unshaped refractories having the following characteristics are very effective. That is to say, the unshaped refractories are characterized in the following specific features.

In the unshaped refractories containing fine particles, whose respective diameters are less than 0.75 mm, and containing aggregates, whose respective diameters are equivalent or more than 0.75 mm to equivalent or less than 10 mm, the said fine particles have the content of MgO of 10 mass %-35 mass %, opposed to 100% of the total mass that the parts of the fine particles has. And, concerning the composition of the said fine particles, the sum total amount of MgO and $Al_2O_3$ is equivalent or more than 90 mass %, opposed to 100% of the total mass that the parts of the fine particles have. And, such fine particles in the unshaped refractories contain, as a source of MgO, the particles made of periclase-spinel, whose content is 5 mass %-40 mass % content, which is opposed to 100% of the whole of the unshaped refractories mass. And the said aggregate consists of alumina and/or particles of spinel.

Furthermore, the above-mentioned particles made of the periclase-spinel contain 40-80 mass % content of MgO, which is opposed to 100% of the total mass of raw material used as a source of MgO. And the remainder, which the particles made of periclase-spinel have as chemical constitution, is $Al_2O_3$.

1) Unshaped refractories comprises:
   fine particles having a diameter of the fine particles being less than 0.75 mm; and,
   aggregate mixed into the fine particles having a diameter of the aggregate being from equal or more than 0.75 mm to equal or less than 10 mm;
   wherein the fine particles have MgO content of equal or more than 10 mass % to equal or less than 35 mass %, to 100 mass % of the whole amount of the fine particles,
   wherein the fine particles have $Al_2O_3$ and MgO content as sum total mass %, being equal or more than 90%, to 100% of the whole amount of the fine particles,
   wherein the fine particles comprise particles made of periclase-spinel as a mineral-phase in a raw material used as a source of MgO, and wherein content of the particle of the periclase-spinel is equal or more than 5 mass % to equal or less than 40 mass %, to 100% of the whole amount of the unshaped refractories, and
   wherein the aggregate comprises at least one particles selected from the group consisting of alumina and spinel.

2) The unshaped refractories according to Item 1), wherein the particles made of periclase-spinel, as the metal-phase in the raw material used as the source of MgO contain 40-80 mass % of MgO and the main remainder of $Al_2O_3$, to total mass 100% of the raw material used as the source of MgO.

3) The unshaped refractories according to Item 1), wherein equipment for desiliconizing molten iron is used for the unshaped refractories as a lining refractory.

4) The unshaped refractories according to Item 1), wherein a ladle for steel-making used for the unshaped refractories as a lining refractory.

5) The unshaped refractories according to Item 1), wherein RH equipment used for the unshaped refractories as a lining refractory.

DETAILED DESCRIPTION

Figure 1:
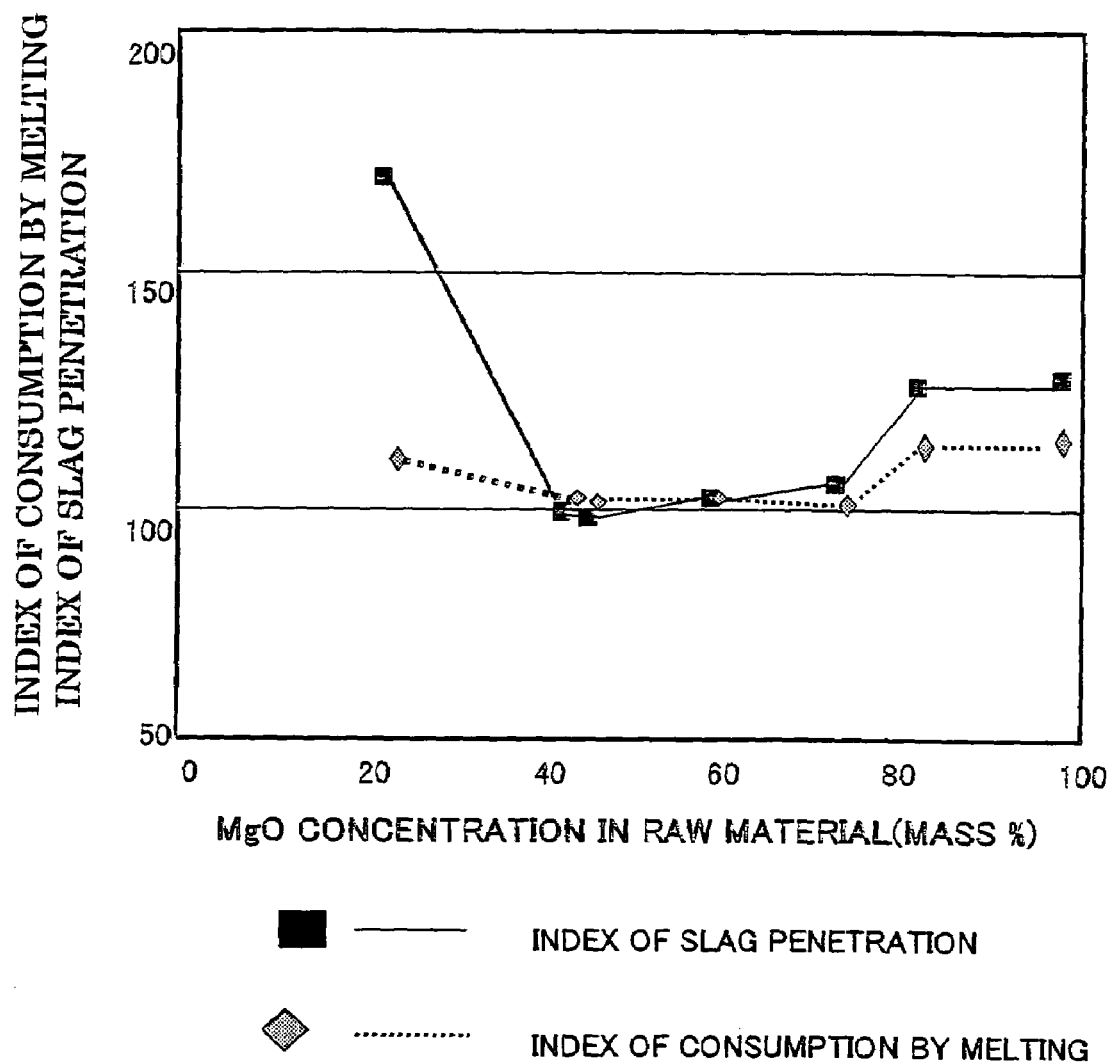
FIG. 1 is a graph showing a relation between concentration of Magnesia (mass %) in accordance with an axis of abscissa, which exists in a raw material as a source of MgO (Magnesia), and an index of consumption by melting and an index of slag penetration in accordance with an axis of ordinate.

The unshaped refractories are mainly constituted of the fine particles having the diameter of less than 0.75 mm, and aggregate having the diameter fallen within a range of equal or more than 0.75 mm to equal or less than 10 mm.

1) Concerning Fine Particles, Whose Diameter-Size is Less Than 0.75 mm.

In the unshaped refractories, the fine particles having the maximum diameter-size under 0.75 mm requires that MgO of 10-35 mass % is contained in the fine particles, and that the sum total amount of MgO and $Al_2O_3$ contained in the said fine particles is equal or more than 90 mass %. (Note: Here, the fine particles are divided into the upper part and the lower part from the screen, by screening. The maximum diameter-size means the maximum value of the respective fine particles of the lower part toward the screen after the fine particles have passed through the screen having a constant interval.)

On the contrary, with less than 90 mass % as, the sum total amount of MgO and $Al_2O_3$ contained in the said fine particles, there leads to a problem that many quantity of the impurities in a matrix exist, resulting in one disadvantage, which means, the corrosion-resistance does not improve, up to a degree of the expectation.

When the unshaped refractories are heated to the temperature degree of the environmental condition, the mutual raw materials composing the unshaped refractories happen to diffuse mutually, resulting in uniforming the unshaped refractories to be homogeneous. In such a case, the smaller the particle-diameter of the raw materials is, the quicker the rate of uniforming comes to be homogeneous. On particular, within an operating-temperature region (approximately 1600) of the unshaped refractories, at first, the particles, whose diameter-size is under 0.75 mm, diffuse mutually. And, the mutual particles become homogeneous to constitute a matrix. On the other hand, the larger particles, whose diameter-size is more than 0.75 mm, are late at diffusing, and late at uniforming to be homogeneous, while joining with particles of other kind of the raw materials. By this reason, the larger particles exist in the distributed state respectively, leading to the isolation as the respective shapes of an island in the matrix, resulting in inviting no mutual uniforming.

Additionally, in case of diffusing and uniforming to be homogeneous, the parts of the fine particles, which form the matrix, come to be composed mainly of the spinel phase, caused by the particles made of the periclase-spinel.

Consequently, in the unshaped refractories, the chemical component of the matrix comes to be in the neighborhood value of spinel-composition (28.3% $MgO-Al_2O_3$). And such spinel-composition stimulates the action, which means, suppressing the slag from being permeated.

Additionally, when MgO contained in the fine particles falls under 10 mass %, the state of the unshaped refractories comes to be closed at alumna-rich side, ending up in insufficient effect on suppressing the slag from being permeated.

Contrarily, when MgO contained in the fine particles falls over than 3.5 mass %, the state of the unshaped refractories, also, spins out to exceed the spinel-composition. Such state brings about the lower effect on suppressing the slag from being permeated, simultaneously with much less structural stability.

By the above-mentioned reasons, the chemical component of the fine particles, whose diameter-size is under 0.75 mm, comprises that MgO of 10-35 mass % exists and that the remainder is mainly constituted of $Al_2O_3$. Moreover, the sum total of MgO and $Al_2O_3$ is equal or more than 90 mass %. Even furthermore, it may be a case, the parts of the fine particles contain $SiO_2$, whose composition is equal or less than 7 mass %, caused by the impurities contained in amorphous silica or aggregate. It may be a case, the fine particles contain CaO, whose composition is equal or less than 3 mass %, resulting from alumina-cement.

The source of MgO in this fine particles requires 5-40 mass % combination of the periclase-spinel particles, opposite to the total mass that the unshaped refractories has. (See the value of the additional amount (mass %) of the raw materials used as a source of MgO in Table 1.)

The reason why the fine particles require 5-40 mass % combination of the periclase-spinel particles is lined up as follows. That is to say:

In case that the additional amount of the periclase-spinel particles falls under about 5 mass %, there comes to be too few amount of MgO in the fine particles, resulting in deteriorating the corrosion-resistance as refractory materials.

On the contrary, in case that the amount the periclase-spinel particles exceed 40 mass %, the quantity of the periclase-spinel particles contained in the fine particles increase to too many extent. Therefore, it becomes necessary to add ultra fine particles of $Al_2O_3$ in order to secure the mobility for the unshaped refractories under construction, and it becomes necessary to add the fine particles of alumina-cement and so forth in order to secure the strength in the cold condition (in another word, in the ambient temperature). As a result, the amount of the fine particles increases too many extents, in comparison with that of the whole of the unshaped refractories.

By the above-mentioned two reasons, it is desirable that the amount of combination, which means, how degree the periclase-spinel particles are combined as a source of MgO in the fine particles, is equal or more than 5 mass % and equal or less than 40 mass % to the total mass % that the unshaped refractories has.

In around 1600° C., which is under the environmental condition for the unshaped refractories, such a source of MgO diffuses into a matrix homogeneously. Therefore, the average diameter of the particle is preferable to fall under 0.75 mm. As mentioned above, the diffusion-velocity is slow, where the particle-size of equal or more than 0.75 mm. Therefore, ingredient elements segregate. In another word, a bigger diameter such as equal or more than 0.75 mm does not enforce Mg-element in the source of MgO to diffuse into the matrix sufficiently. As a consequence of it, MgO-concentration of the matrix becomes low partially. Bt the above-mentioned reason, the particle-diameter of under 0.75 mm is applied to the raw material, as the source of MgO.

Figure 5:
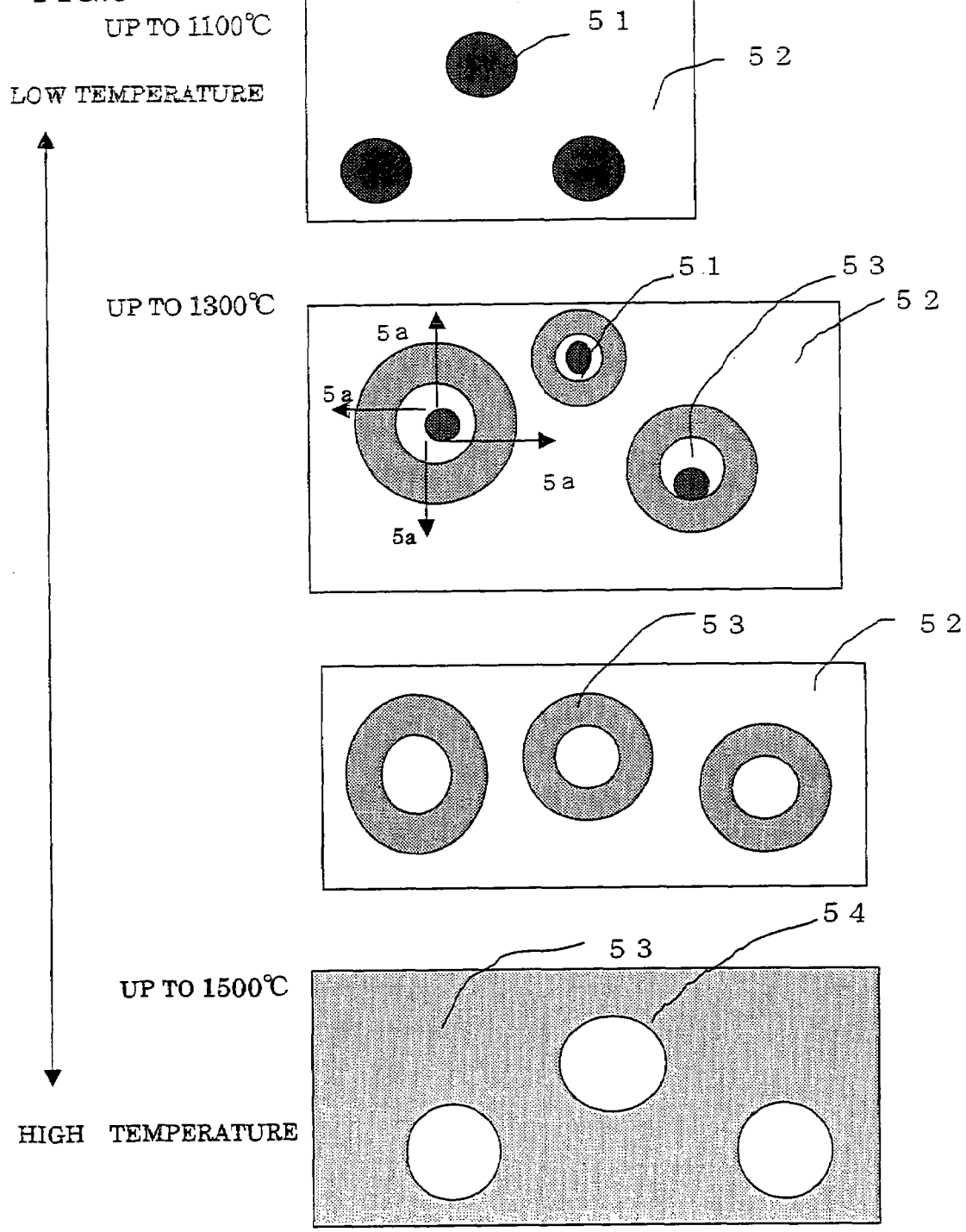
FIG. 5 is a conception drawing in the conventional technology, showing how Alumina-Magnesia material changes the structure in accordance with the sintering process.

From such a view point, this has been understood in the conventional technology though, in case that the above-mentioned source of MgO is constituted of a simple substance (periclase), a MgO-ingredient carries out one-way diffusion at high temperature toward the surrounding particle-layer made of $Al_2O_3$. Resultantly, the part, in which the previous MgO existed, comes to be a vacant trace, caused by the previous MgO running out from this part. Furthermore, the particle of $Al_2O_3$ reacts with the moving MgO to generate spinel, resulting in expanding cubically (See FIG. 5. In this FIG. 5, a numeric reference No. 5a shows one-way diffusion of a MgO ingredient. Moreover, a numeric reference No. is a MgO simple substance. A numeric reference No. 52 is a mixture, which is mainly constituted of $Al_2O_3$ as an ingredient. A numeric reference No 53 is a mixture after the MgO simple substance (51) reacted with the circumferential $Al_2O_3$ (52)). As a result, the cubical expansion as the whole of the matrix occurs. The cubic expansion is caused by the following two kinds of expansions to become the sum total of the expansion. One expansion is a cubic one resulting from changing the specific gravity when the spinel generates. The other expansion is an apparent cubic one, which is equivalent to the traceable part, which means pore, in which the previous MgO existed and from which MgO ran out.

Converting the rate of such cubical expansion to a coefficient of linear expansion, the expansion caused by the traceable part (pore) of MgO comes to be about 4.5 times the cubical expansion caused by the change of the specific gravity. That is to say, it is foreseen that MgO ingredient originates in carrying out one-way diffusion toward the particle-layer made of $Al_2O_3$. Resultantly, as for the unshaped refractories, the characteristic of structural stability with a line of Alumina-Magnesia gets worse. In other words, such deterioration of structural stability happens by the reason such that MgO simple substance (periclase) is applied to be used as a source of MgO.

However, such a problem that the MgO-ingredient, which carrys out one-way diffusion may be avoided by the following constitution. That is, it is solved by adding $Al_2O_3$ as a gradient to MgO simple substance (periclase) rather than using merely the source of MgO only as a MgO simple substance (periclase). This means, constituting of periclase and spinel. However, in this case, without MgO simple substance ingredient exceeding 80 mass % to the whole of the composition (MgO simple substance+$Al_2O_3$) of the source of MgO, it becomes insufficient to obtain the suppressive effect on one-way diffusion of MgO ingredient.

Figure 7:
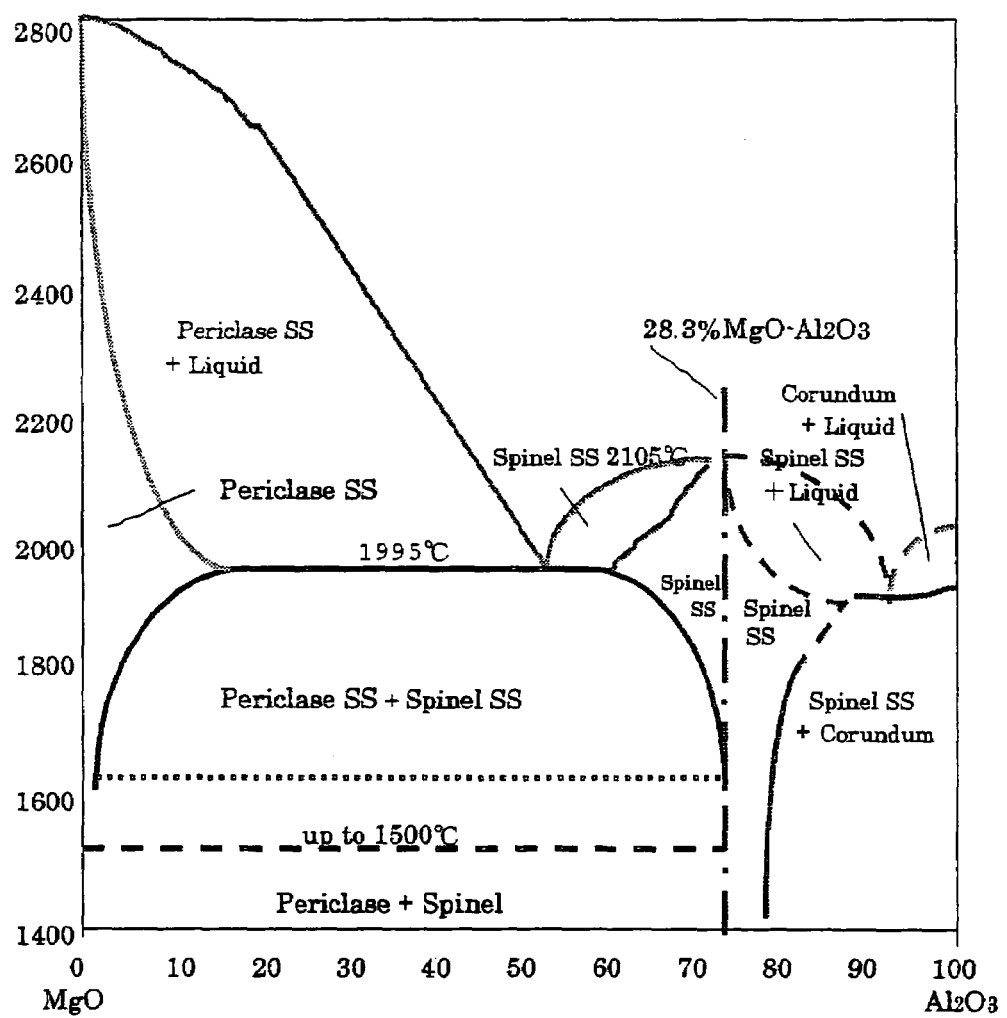
FIG. 7 is a general conception drawing about the state of $MgO-Al_2O_3$ phase, as a general technology.

Taking a look at another constitution, which is, when the source of MgO comes to be alumina-rich (the alumina-content becomes more), in comparison with the constitution of periclase and spinel, the amount of MgO contained in the constitution of the source of MgO becomes insufficient. Here, alumina-rich mean that the source of MgO is constituted of a single spinel, or spinel and corundum. (Note; in this invention, α-alumina is called for 'corundum'. See FIG. 7 of the conventional drawing about the state of MgO—$Al_2O_3$ phase).

As a consequence of it, although the spinel-composition is excellent in corrosion-resistance and slag penetration-resistance, it becomes impossible to enforce a matrix to be constituted of the spinel-composition. Therefore, the source of MgO is preferable to be constituted of periclase and spinel. But, turning over the composition of the source of MgO, which is constituted of periclase and spinel, in case that the content of MgO ingredient as the raw material as MgO becomes to fall below 40 mass % to the total mass of the source of MgO, the MgO ingredient reacts with the ultra fine particles made of the joined alumina and with the joined alumina-cement.

As a result, the reaction consumes MgO, and brings about a shortage in the amount of MgO, however a matrix is going to reach close to the spinel-composition.

By the above-mentioned reasons, the periclase-spinel particles as a source of MgO are desirable to be used as the following chemical composition. That is to say, the chemical composition falls within a range such that MgO concentration is 40 to 80 mass % and the remainder is $Al_2O_3$ to the entire mass % of the source of MgO.

The source of MgO, which consists of ingredient composition as mentioned above, is constituted by periclase and spinel. Therefore, the composition of such periclase and spinel makes it possible to reduce one problem, which is, hydration expansion, in comparison with a simple substance of periclase. Not only the above-mentioned advantage but also another advantage is available, when the composition of such periclase and spinel is applied to the usage in the present invention. That is to say, the composition of such periclase and spinel holds a firm to give an effect on keeping a long usable time, as these unshaped refractories, leading to a long durability.

The reason why the hydration-expansion is avoidable and why the long durability of the unshaped refractories is obtainable is that the flowability of the source of MgO is, normally, prone to dropping, caused by dissolution of Mg ion, when such a source of MgO is mixed with the co-joined water in order to use as unshaped refractories. But, the periclase and spinel makes it possible for such a source of MgO to drop the flowability to much less extent, simultaneously with much less dissolution of Mg ion, in comparison with a simple substance of periclase.

The main ingredient of the remainder of the fine particles, whose size is under 0.75 mm as mentioned above, is $Al_2O_3$ of about 0.1 micrometer of the minimum particle diameter. And the fine particles are mixed to be used with the following sorts of the materials, whether the joined material is single or plural-mixture.

The above-mentioned materials, which are mixed to be joined with the fine particles, are a natural mineral, an electric fused material, a sintered material a calcined material.

Additionally, as for the distribution of the diameter-size of the fine particles, in order to enforce the mutual particles to increase about the charging efficiency as unshaped refractories, it is desirable for the distribution of the diameter-size to have a wide range and to have a gentle-sloping one.

With regard to MgO and $Al_2O_3$, which the above-mentioned fine particles contain as an internal composition, the amount of sum total, which consists of alumina and spinel, is equal or more than 90 mass % to the whole of the mass % of the fine particles. The reason why is that the characteristics such as the corrosion-resistance and the slag penetration-resistance of the unshaped refractories deteriorate, when the other ingredients except MgO and $Al_2O_3$ joins into the fine particles to exceed 10 mass %.

For example, as fine particles other than MgO and $Al_2O_3$, it may be a case, the fine particles made of the amorphous silica is contained, whose content value is 0.2-2 mass % grade (approximately equal or more than 0.2 mass % to approximately equal or less than 2 mass %). The above-mentioned reason is as follows.

Amorphous silica comes to have the characteristic of creep, resulting from producing, at high temperature, a substance whose melting temperature is low. Such characteristic of creep relieves the refractory-material of the stress that has already generated in the refractory one. (Note: As a general, creep is defined as a phenomenon, where strain increases within a range of an elastic-limit, with the elapsed time, when a stress acts on a unit area of an object in a constant time-passage. Such a creep-phenomenon is associated also with the viscosity of material. In order to clarify the meaning of the characteristic of creep in the invention, further explanation is done as follows. That is to say, a substance contained in the amorphous silica has a low melting-temperature, resulting in being prone to melting in a comparatively low temperature. As a consequence of it, such a tendency leads to changing the viscosity, and makes it possible to relieve the refractory-material of the force of the stress, which has occurred inside of the refractory-materials.)

However, the content of the amorphous silica, which falls into a range of less than 0.2 mass %, does not give a sufficient effect on relaxing the force of the stress nor on relieving the force of the stress. From the back of the above-mentioned percentage, opening up with higher percentage, which exceeds 2 mass %, the content of the amorphous silica brings about a superfluous creep within a range of high temperature, ending up with a shrinkage of the whole of the refractory-materials. As a consequence, when cooling the refractory-material, a crack or a breakage occurs. Therefore, the content of the fine particles and, it may be a case, that of the Silica flour made of the amorphous silica, falls within a range of approximately 0.2-2 mass % to the total mass % of the unshaped refractories, while blending into the unshaped refractories, 2) Concerning Aggregate, Whose Particle-Diameter Is Equal Or More Than 0.75 mm To Equal Or Less Than 10 mm.

(Note: 'aggregate' means 'the material mixed with the particles described above 1), when mixing with cement, water and so forth in order to make unshaped refractories'.)

The maximum particle-diameter of aggregate has usually a size of approximately 3-10 mm, in order to enforce a formed body to be homogeneous.

As an aggregate, the particles of alumina and/or those of spinel are suitable. And, it is preferable for this aggregate to be selected from a material, whose coefficient of thermal expansion is in the neighborhood of a matrix-portion (fine particle-portion). The reason is described below, why such an aggregate is preferable. That is to say, when the coefficient value of thermal expansion of the aggregate exists beyond that of a matrix and the former thermal expansion is much far away from the latter one, there occurs a crack or a breakage on the interface made of the aggregate and the matrix, caused by a big deal of difference between the two thermal expansion each other. Such a crack or a breakage enforces the strength of the unshaped refractories to reduce. Eventually, as for the aggregate, the matrix of the unshaped refractories transforms to be constituted of spinel under the environmental condition for usage. Taking into consideration the consistency with spinel, the aggregates are desirable to be alumina and/or spinel having a closed coefficient value of thermal expansion. Additionally explaining, a natural mineral, an electric fused article and a sintered article are respectively applied to such an aggregate on usage. Furthermore, it may be a case, a coarse aggregate, whose particle-diameter exceeds 10 mm and whose maximum one is 40 mm, is applied to be used. In this case, a maximum of 50 mass % grade combination of the coarse aggregate, to the total mass % of the unshaped refractories, is blended into the unshaped refractories. The reason why is that adding such a coarse aggregate becomes possible for the unshaped refractories to demonstrate an effect on improving the characteristic of crack-proof, simultaneously with contributing to the cost-reduction.

3) Concerning Other Additives

With regard to other additives other than the above-mentioned one, as a component of the fine particles in the unshaped refractories, alumina-cement is applied to be used. The added alumina-cement has a content of 0.5-10 mass % grades to the total mass % of these unshaped refractories.

Alumina-cement is, normally, a suitable binder, in order to have a particle-size of from several micro mm to tens of micro one. The alumina-cement is a binder to be used for securing the strength at normal temperature. However, in case that the alumina-cement falls less than 0.5 mass %, it becomes insufficient for the unshaped refractories to secure the strength at normal temperature.

Therefore, the alumina-cement is not preferable to be used in such a case that a constructed object receives a strong external force, after construction and before being sintered. On the other hand, when this alumina-cement exceeds 10 mass % to the total mass of this unshaped refractories, this unshaped refractories has no rise of the intensity. The contained ingredient, CaO, generates $Al_2O_3$ and an ingredient having a low melting point superfluously, resulting in reducing intensity at high temperature.

Therefore, when blending alumina-cement as a binder, alumina-cement is considered to be as 0.5-10 mass % combination, opposite to the total mass % of these unshaped refractories.

Furthermore, in the unshaped refractories, in order to secure the mobility in a low water-content, it may be a case, a cement dispersing-agent is added. Commercial items are applied to be used as this dispersing-agent of alumina cement, such as dispersing-agents made of a line of polycarboxylic acid.

EXAMPLE (1) a. To the following materials;
an aggregate made of the electric fused alumina, whose each particle-size is screened, according to the respective stage of 8-5 mm, 5-3 mm, 3-0.75 mm, and under 0.75 mm (Partially, an aggregate made of the electric fused spinel is used.)
fine particles made of sintered-alumina with an average particle-size of 50 micrometers,
ultra fine particles made of calcined alumina with an average particle size of 2 micrometers, and,
raw materials used as a source of MgO given in Table 1 (it is hereafter called for raw materials made of magnesia.)
b. The following additives are added:
high-alumina cement of 4 mass %, to the total mass % the unshaped refractories.
Silica flour made of amorphous silica of 1 mass %, to the total mass % the unshaped refractories.
the dispersing-agent for high-alumina cement, of 0.1 mass %, excluding this value from the total amount of the unshaped refractories, and in comparison with the total mass % the unshaped refractories.

Adding and blending the above-mentioned material mark b. into the above-mentioned material mark a, a number of the blended materials of the unshaped refractories were blended to be produced, for an example and a comparative example (2) Water of 4.0 mass % was added and mixed with the unshaped refractories blended in the above-mentioned way. And then, mixed materials were prepared to have a tap-flow length of 150-200 mm. Next, the following two specimens were pored into the mold. That is, the square pillar-like specimen of 40×40×160 mm.

the trapezoid pillar-shaped specimen of length 110 mm, whose trapezoid sectional dimension is, respectively, the raised bottom 45 mm, the lower base 70 mm, and the height 40 mm.

After curing such specimen at an ambient temperature for 24 hours, the specimens were taken out from the mold. Afterwards, they were dried at 110° C. for 24 hours. And then, these specimens were sintered at 1500° C.

(3) After curing and sintering, the length of the square pillar-like specimen was measured for the rate of permanent linear change on reheating to be calculated.

(Note: After heating the refractory at the determined temperature and when the heated refractory returns back to the condition at normal temperature, the resulted length of the refractory is compared with the preliminary length before heating. The rate of occupying the secondary length to the preliminary one is expressed in units of percentage. Such a rate is defined as 'permanent linear change on reheating'. Here, when the secondary length in the above-mentioned definition is longer than the preliminary one, the rate is called for 'the rate of permanent linear expansion on reheating'. When the secondary length is shorter than the preliminary one, the rate is called for 'the rate of permanent linear shrinkage on reheating'.)

The specimens of eight sheets combine the trapezoid pillar-shaped specimens so that the raised bottom side serves as an inside. And then, the slag-erosion-examination was carried out by the rotary drum corrosion testing method.

After rising up the temperature of the inside of the drum, up to 1700 degrees C. by a propane-burner, the slag was supplied to the rotary drum, whose basicity is 4.0 and whose chemical composition is as the same as a ladle-slag.

The slag was exchanged for every hour and was held for a total of 5 hours. Afterwards, the slag was cooled. Trapezoid-like specimens were collected. And based on the remaining thickness, the corrosion-depth was measured (Note; the amount of consumption by melting is defined as the consumed thickness, which means, disappeared as a result by melting.). And based on the length of the discoloration part caused by slag penetration, the penetration-depth was measured. The index of the consumption by melting and the index of the slag-penetration were respectively calculated, on the basis of the length of this example 1 of this embodiment.

(4) Tables 1 and 2 show the result of the above-mentioned examination. Table 1 shows a number of the example, and the consecutive Table 2 shows a number of the comparative example. The MgO concentration of the fine particles, whose diameters are under 0.75 mm, shows the magnesia-weight contained in the raw materials made of magnesia, in comparison with the weight 100 of other raw materials. Here, other raw materials means these other than the electric fused aggregate made of alumina, whose particle-sizes are the respective ones of 8-5 mm, 5-3 mm and 3-0.75 mm. (Partially, the electric fused aggregate made of spinel is used.)

a. Concerning the Influence of the Magnesia-Concentration of the Raw Materials Made of Magnesia.

Figure 2:
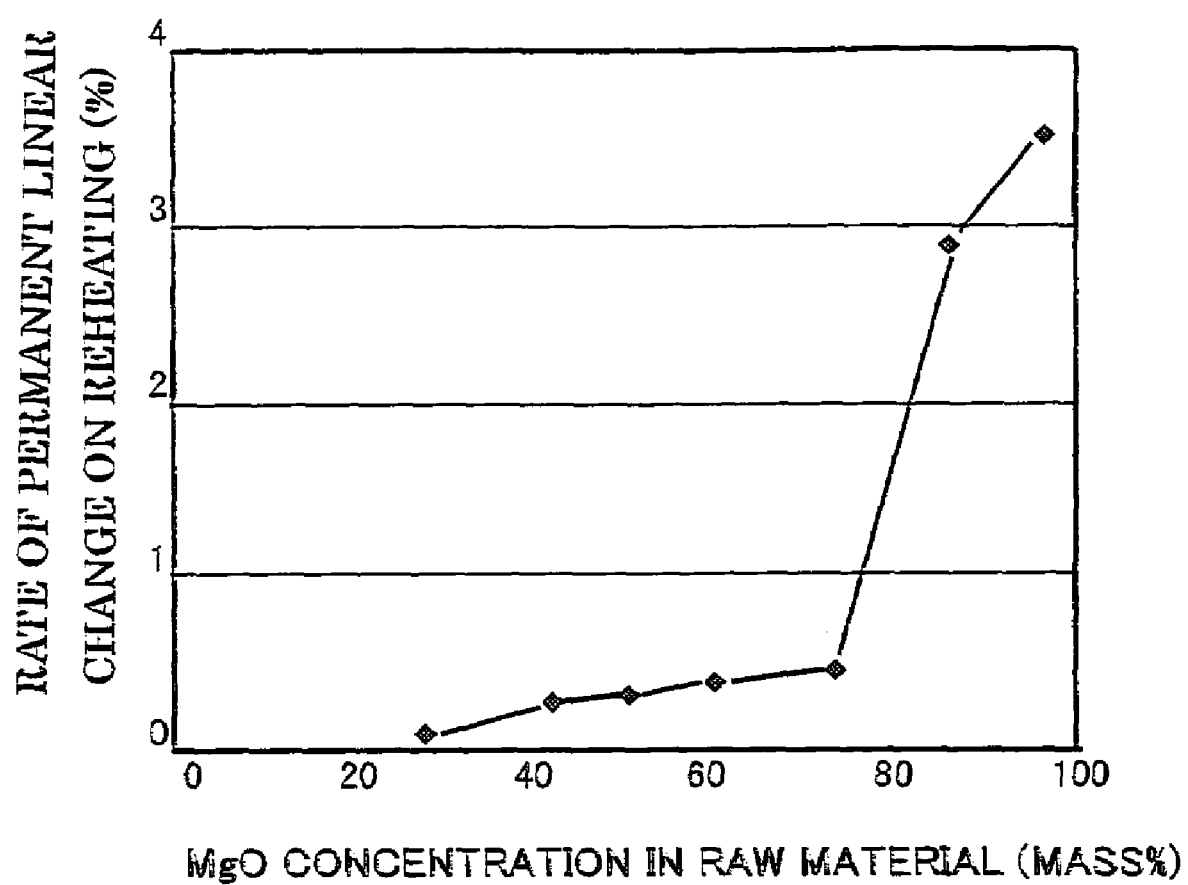
FIG. 2 is a graph showing a relation between concentration of Magnesia (mass %) in accordance with an axis of abscissa, which exists in a raw material as a source of MgO (Magnesia), and the rate of permanent linear change on reheating in accordance with an axis of ordinate.

FIGS. 1 and 2 show a plotted result of the following value, that is, the index of the amount consumed by melting, the index of the slag-osmosis and the rate of permanent linear expansion, which relates to these examples 1-4 and the comparative examples 1-3 of this embodiment. As shown in these figures, in case that the magnesia-concentration in the raw material made of magnesia is less than 40 mass % (this case is equivalent to the conventional one, when the unshaped refractories made of a line of aluminum-spinel is used. See the amount of additive materials used as the source of MgO in Table 2.), the amount of the spinel generates to a small degree, by sintering. In this case, although the rate of permanent linear expansion is low, the slag-penetration resistance is inferior.

On the contrary, in case that the magnesia-concentration exceeds 80 mass % (this case is equivalent to the conventional one, when the unshaped refractories made of a line of aluminum-magnesia is used. See the amount of additive materials used as the source of MgO in Table 2.) In this case, the rate of permanent linear expansion becomes remarkably high, caused by the expansion resulting from one-way diffusion of magnesia. Moreover, in a consequence of making a lot of pores by such expansion, corrosion-resistance and slag penetration-resistance have also come to be inferior.

On the other hand, as shown in the example of this aspect ,in case that the magnesia-concentration contained in the raw materials made of magnesia falls within the limits of 40-80 mass %, spinel generates by sintering, to be secured in the unshaped refractories. Therefore, both corrosion-resistance and slag penetration-resistance are excellent. Not only such excellence but also another one appears. That is, no one-way diffusion takes place, which causes an expansion on sintering. This enables the unshaped refractories to have a low rate of permanent linear expansion.

Moreover, there is not more number of pores to happen, successive to the expansion by sintering. Consequently, there becomes no damage about the quality, being influenced by the inferior corrosion-resistance and by the inferior slag penetration-resistance.

Figure 6:
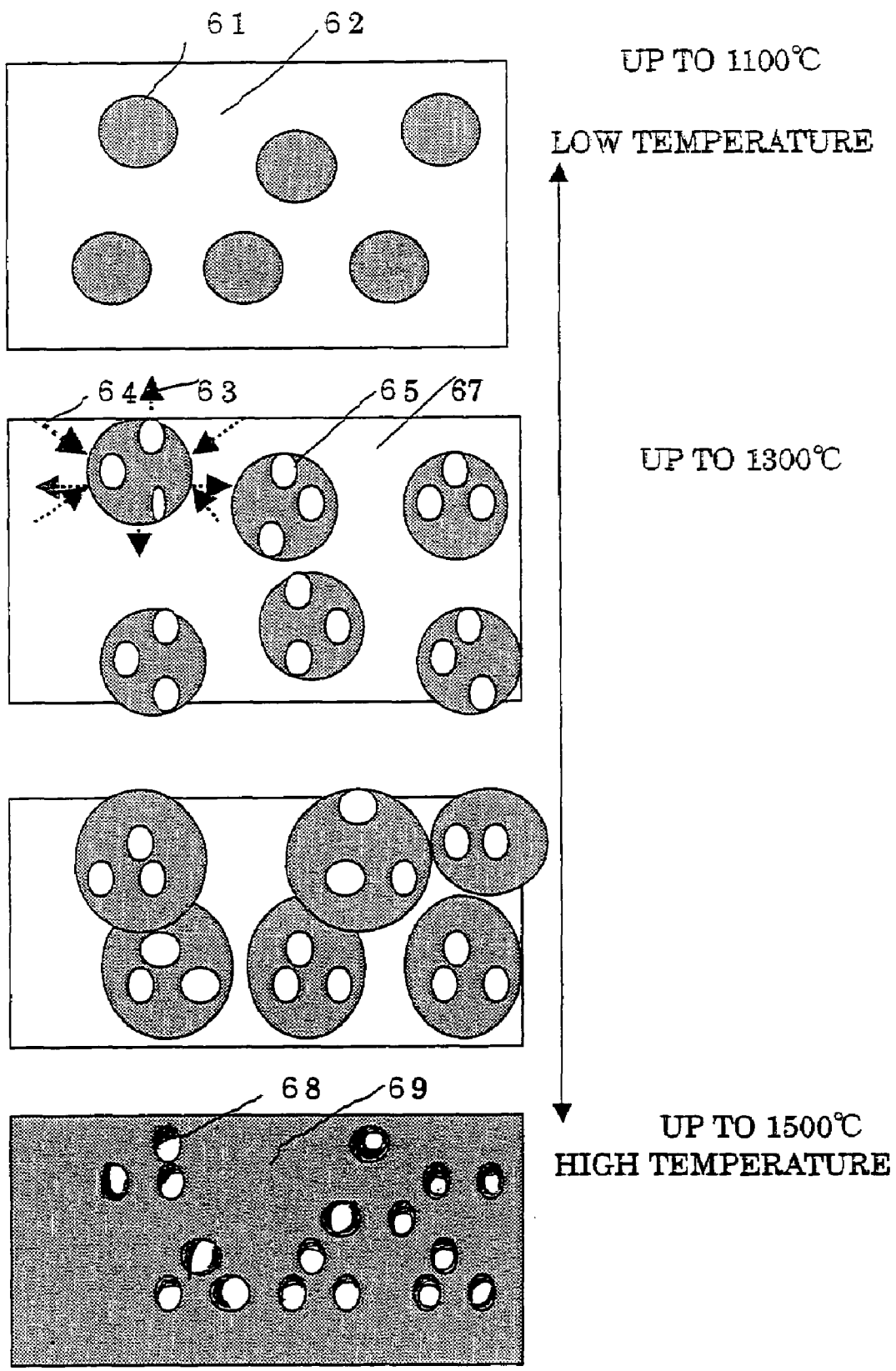
FIG. 6 is a conception drawing in the present invention, showing how Alumina-Magnesia material changes the structure in accordance with the sintering process.

FIG. 6 shows a concept, which relates to the sintering-process of aluminum-magnesium material and the change of the structure.

Here, as for a numeric reference No. 61 is a single substance of MgO. A numeric reference No. 62 and 67 are the mixtures of mainly alumina ($Al_2O_3$) and other kind of substances. Arrow sign 63 indicates the diffusion from the side of MgO simple substance to be diffused to side of the surrounding alumina and others. On the contrary, arrow sign 64 indicates, in an opposite way, the diffusion from the alumina ($Al_2O_3$) side to the MgO simple substance side. That is, one-way diffusion does not take place but this invention serves as mutual diffusion of MgO and $Al_2O_3$. Numeric reference No. 65 and 68 are air bubbles produced by diffusion of MgO. However, the pore-size after MgO diffusion is very small. Numeric reference No. 69 is a spinel-structure, resulting from the action between the magnesia (MgO) and mainly alumina($Al_2O_3$). As shown in FIG. 6, at high temperature, the pore resulting from the trace where MgO omissted, is extremely small. In addition, the thermal expansion is also small.

Thus, the unshaped refractories of this aspect have the specific feature, which enforces fine size of spinel to generate, simultaneously with no expanding on sintering. And it was assured that this aspect opens up to a new material, which makes it possible to have both of the advantages, which the unshaped refractories of a line of alumina-spinel has and that of a line of alumina-magnesia has, in comparison with the conventional materials.

b. Concerning the Influence of the Magnesia-Concentration of Fine Particles, Whose Particle-Size is Under 0.75 mm.

Figure 3:
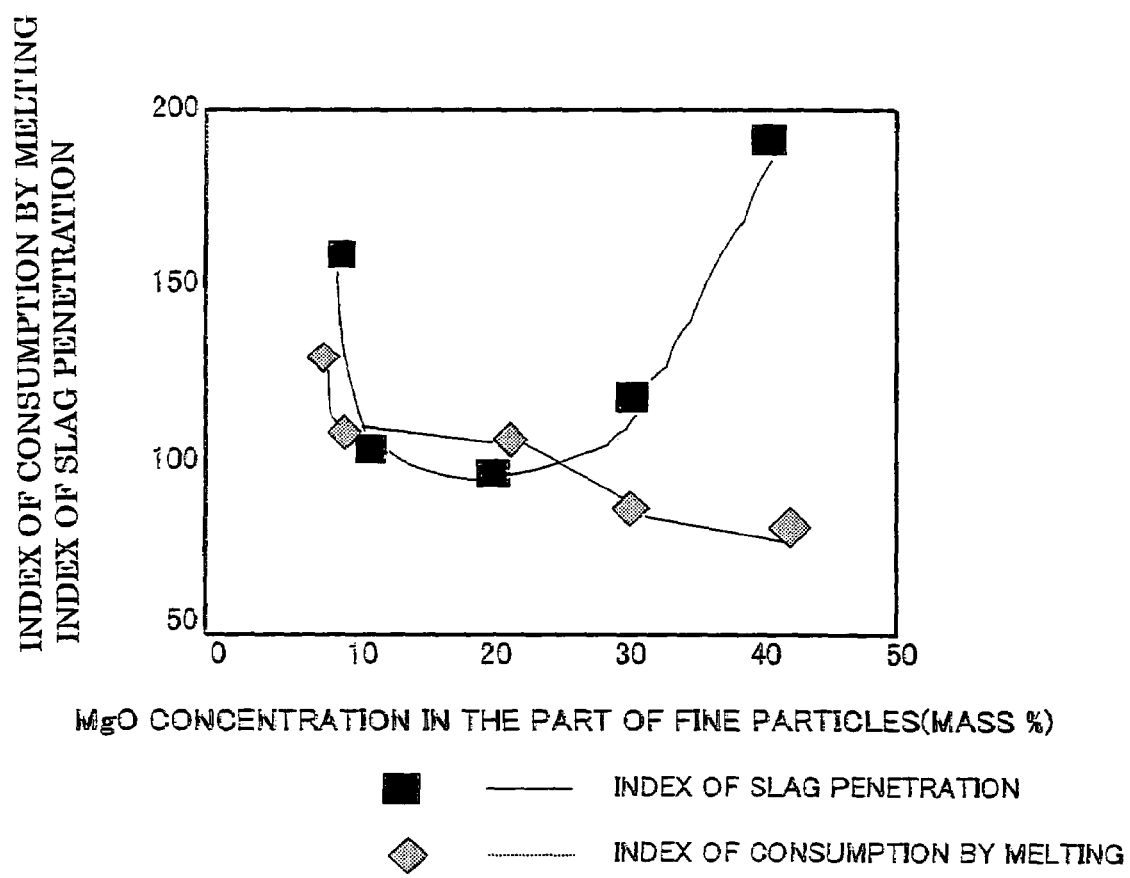
FIG. 3 is a graph showing a relation between concentration of Magnesia existing in the fine particles, whose diameter-size is less than 0.75 mm in accordance with an axis of abscissa, and an index of consumption by melting and an index of slag penetration in accordance with an axis of ordinate.
Figure 4:
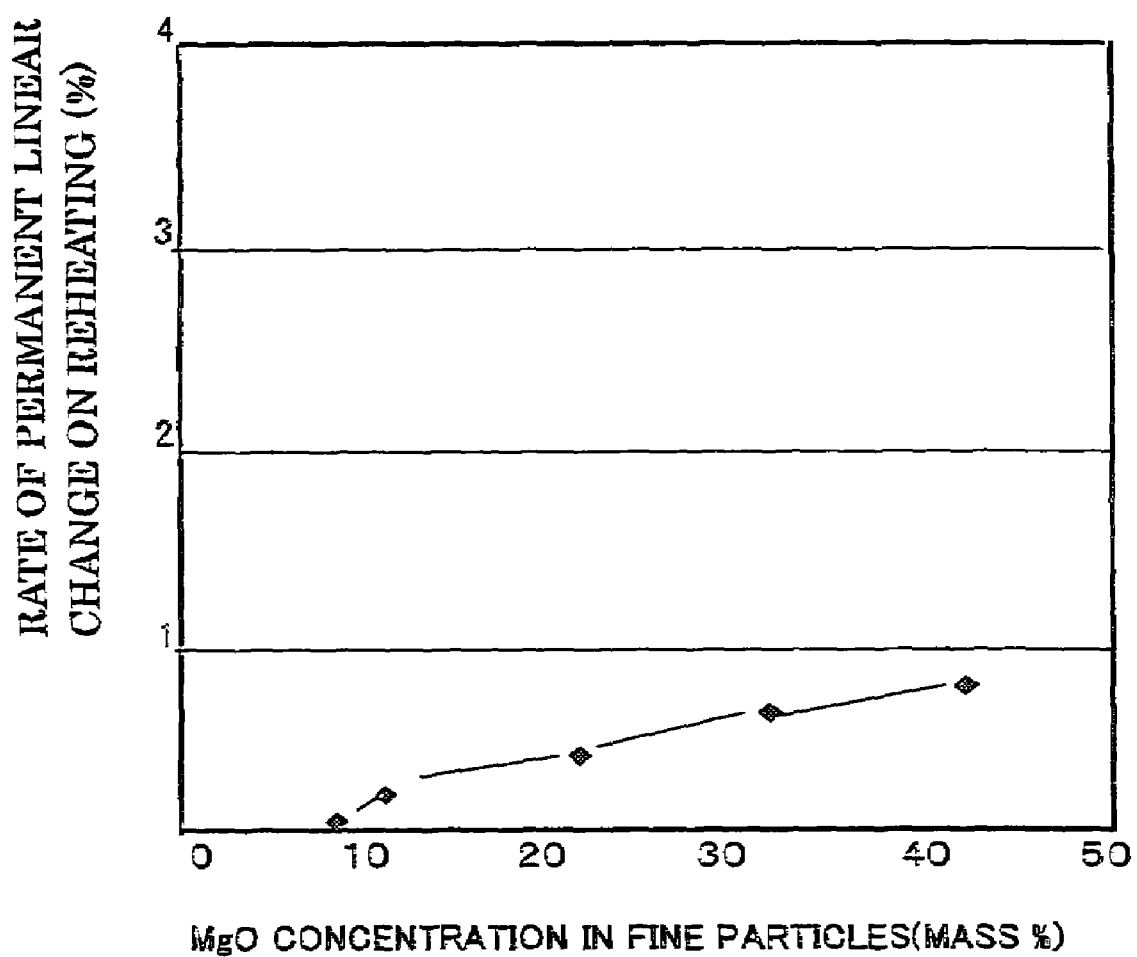
FIG. 4 is a graph showing a relation between concentration of Magnesia existing in the fine particles, whose diameter-size is less than 0.75 mm in accordance with an axis of abscissa, and a rate of permanent linear change on reheating in accordance with an axis of ordinate.

FIG. 3 shows the magnesia-concentration of fine particles below 0.75 mm, and a relation between an index of consumption by melting and that of slag penetration. Furthermore, FIG. 4 shows a relation between the magnesia-concentration of fine particles below 0.75 mm, and the rate of permanent linear expansion. FIGS. 3 and 4 shows that the value of the examples corresponds to 6, 8, and 9, and that of the comparative examples correspond to 5 and 6.

As shown in FIG. 4, the rate of permanent linear change on reheating is hardly influenced by the MgO-concentration of the fine particles. The reason why is that no one-way diffusion of magnesia takes place, in case that the magnesia-concentration of the materials made of magnesia falls within a range of 40-80 mass % to mass % of the raw material of MgO. As shown in FIG. 3, the higher the MgO-concentration of the fine particles becomes, the lower the index of the consumption by melting becomes. (the lower index value consumed by melting means the higher corrosion-resistance). The index of the slag penetration deteriorated, when the MgO-concentration of fine particles was less than 10 mass % or exceeded 35 mass %. Contrarily, as shown in the values of the examples, any results, concerning the index of the consumption by melting, the index of slag penetration and the rate of permanent linear change on reheating, express the respective excellent ones, when the MgO-concentration of the fine particles falls within a range of 10-35 mass %.

c. Concerning the Influence of the Size of the Raw Materials as a Source of MgO, Contained in the Fine Particles.

In comparison with the examples and the comparative one, which is, the former ones are No. 5, 6 and 7 and the latter one is No. 4, the following results are found out. That is to say, when the size exceeds 0.75 mm (the comparative example, No. 4), insufficient fine spinel generates on sintering. In a consequence of it, the characteristic of slag penetration depredates to a great extent, although there is little degradation of the characteristic of the corrosion-resistance. On the other hand, when the size of the raw materials as a source of MgO is under 0.75 mm, it is secured that the rate of generating spinel on sintering, resulting in enforcing the fine spinel to generate. Consequently, and the excellent results are also obtained in any of the following values, which are, an index of a consumption by melting, an index of a slag penetration, and the rate of permanent linear expansion.

Moreover, similar to the example 10, I make it possible to use spinel, not as alumina but as aggregate. Such a usage enables the unshaped refractories to improve the outstanding slag penetration-resistance and the structural stability (a low rate of permanent linear expansion). In addition to such two sorts of improvement, corrosion-resistance can also improve. Although, in the example 11, the amorphous silica of impurities is high and $MgO+Al_2O_3$ contained in the fine particles serves as a 90 mass % grade to the total mass % of the fine particles, such a range falls within a good one, which allows the corrosion-resistance, the slag penetration-resistance and the structural stability to fall into.

As explained above, I disclose that the magnesia-concentration, which the raw materials used as the source of MgO has, is equal or more than 40 mass % and equal or less than 80 mass % (40 to 80 mass %). The percentage is opposed to the total mass 100 of the raw materials, which serve as a source of MgO. Such determination mentioned above suppresses the unshaped refractories from expanding thermally in a sintering process. At the same moment, the particle diameter of the raw material used as the source of MgO is determined to be under 0.75 mm. Such a determination makes it possible for the spinel to secure the generation-speed, when sintering the unshaped refractories. Furthermore, as for a composition of such a part of the fine particles, the unshaped refractories that has the following superiority is obtained, resulting from the MgO concentration 10-35 mass % to the total mass 100 which this fine particles has.

That is, in the sintering process of these unshaped refractories, the spinel that is excellent both in corrosion-resistance and in slag penetration-resistance generates minutely.

The unshaped refractories are a material that has both of the two advantages to be unified, in comparison with the conventional technology, which means, one advantage that the unshaped refractories made of a line of aluminum-spinel indicates and the other advantage that the unshaped refractories made of a line of aluminum-magnesia indicates.

TABLE 1

|  |  |  |  | Examples | | | | |
|---|---|---|---|---|---|---|---|---|
|  |  |  |  | 1 | 2 | 3 | 4 | 5 |
| Fine particle | Raw material as a source of MgO | Metal phase | | Pericles-Spinel | Pericles-Spinel | Pericles-Spinel | Pericles-Spinel | Pericles-Spinel |
|  |  | MgO concentration(mass %) | | 45 | 60 | 75 | 50 | 50 |
|  |  | Particle size (mm) | | <0.5 mm | <0.5 mm | <0.5 mm | <0.5 mm | <0.75 mm |
|  |  | Additive amount(mass %) | | 22.2 | 16.7 | 13.3 | 20.0 | 20.0 |
|  | Sintered alumina fine particle (Ave. 50 μm) | Additive amount(mass %) | | 7.2 | 11.6 | 14.7 | 9.5 | 9.5 |
|  | Calcined alumina | Additive amount(mass %) | | 11.6 | 12.7 | 13.0 | 11.5 | 11.5 |
|  | Amorphous Silica flour | Additive amount(mass %) | | 1.0 | 1.0 | 1.0 | 1.0 | 1.0 |
|  | Alumina cement | Additive amount(mass %) | | 4.0 | 4.0 | 4.0 | 4.0 | 4.0 |
|  | Composition of the part of fine particle | MgO concentration (mass %) | | 21.7 | 21.7 | 21.7 | 21.7 | 21.7 |
|  |  | Al2O3 + MgO (mass %) | | 96.4 | 96.4 | 96.4 | 96.4 | 96.4 |
| Aggregate | Kind of aggregate | | | Alumina | Alumina | Alumina | Alumina | Alumina |
|  |  | Electric | 5-8 mm | 20 | 20 | 20 | 20 | 20 |
|  |  | fused | 3-6 mm | 10 | 10 | 10 | 10 | 10 |
|  |  | Alumina | 0.75-3 mm | 24 | 24 | 24 | 24 | 24 |
|  |  | Electric | 5-8 mm | — | — | — | — | — |
|  |  | fused | 3-5 mm | — | — | — | — | — |
|  |  | Spinel | 0.75-3 mm | — | — | — | — | — |

TABLE 1-continued

|  |  |  |  |  |  |  |  |
|---|---|---|---|---|---|---|---|
|  | corrosion resistance | Index of consumption by melting *1 | 100 | 102 | 99 | 103 | 100 |
|  | Slag penetration resistance | Index of penetration *1 | 100 | 102 | 106 | 99 | 97 |
|  | Structural stability | Rate of permanent linear change on reheating *2 | 0.25 | 0.32 | 0.44 | 0.23 | 0.25 |

|  |  |  | Examples | | | | |
|---|---|---|---|---|---|---|---|
|  |  |  | 6 | 7 | 8 | 9 | 10 |
| Fine particle | Raw material as a source of MgO | Metal phase | Pericles-Spinel | Pericles-Spinel | Pericles-Spinel | Pericles-Spinel | Pericles-Spinel |
|  |  | MgO concentration(mass %) | 50 | 50 | 75 | 45 | 50 |
|  |  | Particle size (mm) | <0.3 mm | <0.1 mm | <0.3 mm | <0.75 mm | <0.3 mm |
|  |  | Additive amount(mass %) | 20.0 | 20.0 | 6.7 | 33.3 | 20.0 |
|  | Sintered alumina fine particle (Ave. 50 μm) | Additive amount(mass %) | 9.5 | 9.5 | 18.3 | 0 | 9.5 |
|  | Calcined alumina | Additive amount(mass %) | 11.5 | 11.5 | 16.0 | 7.7 | 11.5 |
|  | Amorphous Silica flour | Additive amount(mass %) | 1.0 | 1.0 | 1.0 | 1.0 | 1.0 |
|  | Alumina cement | Additive amount(mass %) | 4.0 | 4.0 | 4.0 | 4.0 | 4.0 |
|  | Composition of the part of fine particle | MgO concentration (mass %) | 21.7 | 21.7 | 10.9 | 32.6 | 21.7 |
|  |  | Al2O3 + MgO (mass %) | 96.4 | 96.4 | 96.4 | 96.4 | 96.4 |
| Aggregate | Kind of aggregate |  | Alumina | Alumina | Alumina | Alumina | Spinel |
|  |  | Electric 5-8 mm | 20 | 20 | 20 | 20 | — |
|  |  | fused 3-5 mm | 10 | 10 | 10 | 10 | — |
|  |  | Alumina 0.75-3 mm | 24 | 24 | 24 | 24 | — |
|  |  | Electric 5-8 mm | — | — | — | — | 20 |
|  |  | fused 3-5 mm | — | — | — | — | 10 |
|  |  | Spinel 0.75-3 mm | — | — | — | — | 24 |
|  | corrosion resistance | Index of consumption by melting *1 | 101 | 97 | 111 | 89 | 85 |
|  | Slag penetration resistance | Index of penetration *1 | 96 | 96 | 110 | 120 | 111 |
|  | Structural stability | Rate of permanent linear change on reheating *2 | 0.26 | 0.15 | 0.12 | 0.42 | 0.24 |

|  |  |  | Examples 11 |
|---|---|---|---|
| Fine particle | Raw material as a source of MgO | Metal phase | Pericles-Spinel |
|  |  | MgO concentration(mass %) | 50 |
|  |  | Particle size (mm) | <0.3 mm |
|  |  | Additive amount(mass %) | 20.0 |
|  | Sintered alumina fine particle (Ave. 50 μm) | Additive amount(mass %) | 7.5 |
|  | Calcined alumina | Additive amount(mass %) | 7.5 |
|  | Amorphous Silica flour | Additive amount(mass %) | 7.0 |
|  | Alumina cement | Additive amount(mass %) | 4.0 |
|  | Composition of the part of fine particle | MgO concentration (mass %) | 21.7 |
|  |  | $Al_2O_3$ + MgO (mass %) | 90.4 |
| Aggregate | Kind of aggregate |  | Alumina |
|  |  | Electric 5-8 mm | 20 |
|  |  | fused 3-5 mm | 10 |
|  |  | Alumina 0.75-3 mm | 24 |
|  |  | Electric 5-8 mm | — |
|  |  | fused 3-5 mm | — |
|  |  | Spinel 0.75-3 mm | — |
|  | corrosion resistance | Index of consumption by melting *1 | 100 |
|  | Slag penetration resistance | Index of penetration *1 | 98 |
|  | Structural stability | Rate of permanent linear change on reheating *2 | 0.28 |

In the above-mentioned Table 1(1/3-3/3),
*1 indicates the relative values of the corrosion-depth and the slag-penetration depth (to the value of example 1 as 100), whose result is measured by a rotary drum corrosion test. (The slag, whose basicity is 4. was exchanged every hour, for 1700 degree-C. × 5 hours.)
*2 indicates the rate of linear change in the atmosphere, after sintering under the condition of 1500 degree-C. × 3 hours.

TABLE 2

| | | | Examples | | | | |
|---|---|---|---|---|---|---|---|
| | | | 1 | 2 | 3 | 4 | 5 |
| Fine particle | Raw material as a source of MgO | Metal phase | Spinel | Pericles-Spinel | Pericles | Pericles-Spinel | Pericles-Spinel |
| | | MgO concentration(mass %) | 28 | 85 | 98 | 50 | 50 |
| | | Particle size (mm) | <0.5 mm | <0.6 mm | <0.3 mm | 1-3 mm | <0.3 mm |
| | | Additive amount(mass %) | 35.7 | 11.8 | 10.2 | 20.0 | 8.0 |
| | Sintered alumina fine particle (Ave. 50 μm) | Additive amount(mass %) | 0 | 16.0 | 16.5 | 20.0 | 18.5 |
| | Calcined alumina | Additive amount(mass %) | 5.3 | 13.2 | 14.3 | 18.0 | 12.5 |
| | Amorphous Silica flour | Additive amount(mass %) | 1.0 | 1.0 | 1.0 | 1.0 | 1.0 |
| | Alumina cement | Additive amount(mass %) | 4.0 | 4.0 | 4.0 | 4.0 | 4.0 |
| | Composition of the part of fine particle | MgO concentration (mass %) | 21.7 | 21.7 | 21.7 | 21.7 | 8.7 |
| | | Al2O3 + MgO (mass %) | 96.4 | 96.4 | 96.4 | 96.4 | 96.4 |
| Aggregate | Kind of aggregate | | Alumina | Alumina | Alumina | Alumina | Alumina |
| | | Electric fused Alumina 5-8 mm | 20 | 20 | 20 | 20 | 20 |
| | | 3-5 mm | 10 | 10 | 10 | 10 | 10 |
| | | 0.75-3 mm | 24 | 24 | 24 | 7 | 24 |
| | | Electric fused Spinel 5-8 mm | — | — | — | — | — |
| | | 3-5 mm | — | — | — | — | — |
| | | 0.75-3 mm | — | — | — | — | — |
| | corrosion resistance | Index of consumption by melting *1 | 118 | 109 | 111 | 108 | 126 |
| | Slag penetration resistance | Index of penetration *1 | 165 | 122 | 126 | 180 | 163 |
| | Structural stability | Rate of permanent linear change on reheating *2 | 0.04 | 2.9 | 3.5 | 0.03 | 0.05 |

| | | | Examples 6 |
|---|---|---|---|
| Fine particle | Raw material as a source of MgO | Metal phase | Pericles-Spinel |
| | | MgO concentration(mass %) | 75 |
| | | Particle size (mm) | <0.3 mm |
| | | Additive amount(mass %) | 26.0 |
| | Sintered alumina fine particle (Ave. 50 μm) | Additive amount(mass %) | 7.0 |
| | Calcined alumina | Additive amount(mass %) | 9.0 |
| | Amorphous Silica flour | Additive amount(mass %) | 1.0 |
| | Alumina cement | Additive amount(mass %) | 4.0 |
| | Composition of the part of fine particle | MgO concentration (mass %) | 40.8 |
| | | Al2O3 + MgO (mass %) | 90.4 |
| Aggregate | Kind of aggregate | | Alumina |
| | | Electric fused Alumina 5-8 mm | 20 |
| | | 3-5 mm | 10 |
| | | 0.75-3 mm | 24 |
| | | Electric fused Spinel 5-8 mm | — |
| | | 3-5 mm | — |
| | | 0.75-3 mm | — |
| | corrosion resistance | Index of consumption by melting *1 | 85 |
| | Slag penetration resistance | Index of penetration *1 | 185 |
| | Structural stability | Rate of permanent linear change on reheating *2 | 0.48 |

In the above-mentioned Table 2(1/3-3/3),
*1 indicates the relative values of the corrosion-depth and the slag-penetration depth (to the value of example 1 as 100), whose result is measured by a rotary drum corrosion test. (The slag, whose basicity is 4.0, was exchanged every hour, for 1700 degree-C. × 5 hours.)
*2 indicates the rate of linear change in the atmosphere, after sintering under the condition of 1500 degree-C. × 3 hours.

This technology applies to usage of unshaped refractories, which is a refractory-material for the formed article by casting, such as equipment for desiliconizing molten iron, a ladle for steel-making and vacuum-degassing equipment for steel making.

These unshaped refractories are suitable to the unshaped refractories made by casting-construction, spray-construction, stamp-construction, and so forth. Moreover, the unshaped refractories are applicable to any uses as unshaped refractories for lining refractory. Any one of the above-mentioned applications is merely one application. The practical usage is not always limited to the described ones.

In such a way, the particles of the periclase-spinel are used, while applying to the parts that forms a matrix on heating. Therefore, even when the cubical expansion happens by generating spinel-phase, the degree of the cubical expansions is very small. And also, no one-way diffusion of magnesia happens, so that no generating the pore happens. As a consequence, the refractories excel in the characteristics of the corrosion-resistance and the slag penetration-resistance. The present invention excels not only in such characteristics but also in the characteristic of structural stability that unshaped refractories hold.

What is claimed is:

1. Unshaped refractories consisting essentially of:
fine particles having a diameter less than 0.75mm; and,
aggregate mixed into the fine particles having a diameter between 0.75mm and 10mm;
wherein the fine particles have MgO content between 10 mass % and 35 mass % of the entire amount of the fine particles,
wherein the fine particles have $Al_2O_3$ and MgO content as sum total mass %, being between 90% and 100% of the entire amount of the fine particles,
wherein the fine particles consist essentially of particles made of 0.5-10 mass % of alumina cement based on the total mass of the unshared refractories and periclase-spinel as a mineral-phase in a raw material used as a source of MgO containing 40-8 0 mass % of MgO and the main remainder of $Al_2O_3$, to total mass 100% of the raw material used as the source of MgO, and wherein content of the particle of the periclase-spinel is between 5 mass % and 40 mass, to 100% of the whole amount of the unshaped refractories, and
wherein the aggregate consists essentially of at least one particle selected from the group consisting of alumina and spinel.

2. Unshaped refractories consisting of:
fine particles having a diameter less than 0.75mm; and,
aggregate mixed into the fine particles having a diameter between 0.75mm and 10mm;
wherein the fine particles have MgO content between 10 mass % and 35 mass % of the entire amount of the fine particles,
wherein the fine particles have $Al_2O_3$ and MgO content as sum total mass %, being between 90% and 100% of the entire amount of the fine particles,
wherein the fine particles consist essentially of particles made of 0.5-10 mass % of alumina cement based on the total mass of the unshaped refractories and periclase-spinel as a mineral-phase in a raw material used as a source of MgO containing 40-80 mass % of MgO and the main remainder of $Al_2O_3$, to total mass 100% of the raw material used as the source of MgO, and wherein content of the particle of the periclase-spinel is between 5 mass % and 40 mass, to 100% of the whole amount of the unshaped refractories, and
wherein the aggregate consists essentially of at least one particle selected from the group consisting of alumina and spinel.

3. The unshaped refractories according to claim 1, wherein the fine particles further include 0.2-2 mass % of amorphous silica based on the total mass of the unshaped refractories.

4. The unshaped refractories according to claim 2, wherein the fine particles further include 0.2-2 mass % of amorphous silica based on the total mass of the unshaped refractories.

* * * * *

UNITED STATES PATENT AND TRADEMARK OFFICE
CERTIFICATE OF CORRECTION

PATENT NO. : 7,459,409 B2
APPLICATION NO. : 11/159797
DATED : December 2, 2008
INVENTOR(S) : Kiyota Page 1 of 1

It is certified that error appears in the above-identified patent and that said Letters Patent is hereby corrected as shown below:

<u>In Column 5</u>
At line 50, please change "1600" to -- 1600° C --.

<u>In Column 15</u>
At Table 1 – continued, at Example 6, please change "96" to -- 95 --.

Signed and Sealed this

Twenty-first Day of April, 2009

JOHN DOLL
*Acting Director of the United States Patent and Trademark Office*